United States Patent [19]

Hurd

[11] Patent Number: 4,921,576

[45] Date of Patent: May 1, 1990

[54] METHOD FOR IMPROVING SWEEP EFFICIENCY IN CO₂ OIL RECOVERY

[75] Inventor: Billy G. Hurd, Coppell, Tex.

[73] Assignee: Mobil Oil Corporation, New York, N.Y.

[21] Appl. No.: 340,741

[22] Filed: Apr. 20, 1989

[51] Int. Cl.⁵ .................... E21B 33/138; E21B 43/22; E21B 47/06

[52] U.S. Cl. .................... 166/252; 166/270; 166/273; 166/294; 166/295

[58] Field of Search ............ 166/252, 270, 273, 274, 166/294, 295, 300; 523/130

[56] References Cited

U.S. PATENT DOCUMENTS

| | | | |
|---|---|---|---|
| 3,782,467 | 11/1974 | Hessert | 166/295 X |
| 3,952,806 | 4/1976 | Trantam | 166/294 |
| 3,965,986 | 6/1976 | Christopher | 166/270 X |
| 4,215,001 | 7/1980 | Elphingstone et al. | 166/307 X |
| 4,337,159 | 6/1982 | Reed et al. | 166/274 X |
| 4,472,291 | 9/1984 | Rosano | 166/275 X |
| 4,503,912 | 3/1985 | Norton | 166/295 |
| 4,569,393 | 2/1986 | Bruning et al. | 166/295 X |
| 4,673,038 | 6/1987 | Sandiford et al. | 166/295 X |

OTHER PUBLICATIONS

Barakat, Y. et al., "Alpha-Olefin Sulfonates for Enhanced Oil Recovery", 2nd European EOR Symposium, Paris, 1982, pp. 11-20.

Oates, J. D. et al., "Foams for Mobility Control in CO₂ Flooding", 3rd annual report of CEOGRR, UT-Austin, 1986, pp. 76-79.

Oates, J. D. et al., "Influence of CO₂ on Surfactant Systems", 4th annual report of CEOGRR, UT-Austin, 1987, pp. 29-41.

*Primary Examiner*—George A. Suchfield
*Attorney, Agent, or Firm*—Alexander J. McKillop; Charles J. Speciale; Lawrence O. Miller

[57] ABSTRACT

Volumetric sweep efficiency and oil recovery by $CO_2$ flooding processes may be increased by injecting a surfactant solution into the formation which will form a gel in-situ in the high permeability zones via interaction of the surfactant with formation brine, oil, and $CO_2$ under formation conditions. Thereafter, improved oil recovery efficiency is realized in displacing oil from the lesser permeability zones. The surfactant solution is selected from phase behavior experiments which show gel precipitation at conditions of temperature, salinity, oil composition, and $CO_2$ pressure which are expected to exist or may be practically established in the particular oil-containing formation. Preferably, the gel is precipitated at $CO_2$ pressures above the minimum miscibility pressure for $CO_2$ miscible flooding, and below the prevailing formation pressure during the $CO_2$ flooding. The surfactant solution may be injected into the reservoir as an aqueous solution or as a microemulsion solution prepared in surface mixing facilities. The surfactant solution may also be injected prior to injection of $CO_2$, or may be alternately injected in WAG cycles following $CO_2$ breakthrough into production wells.

46 Claims, 6 Drawing Sheets

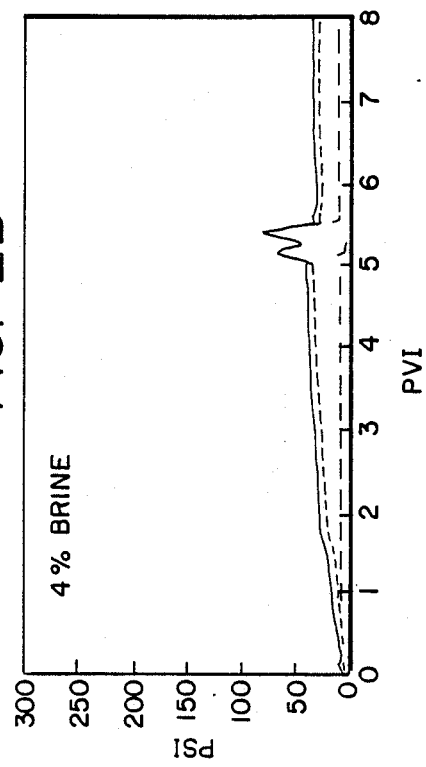
FIG. 2A
FIG. 2B
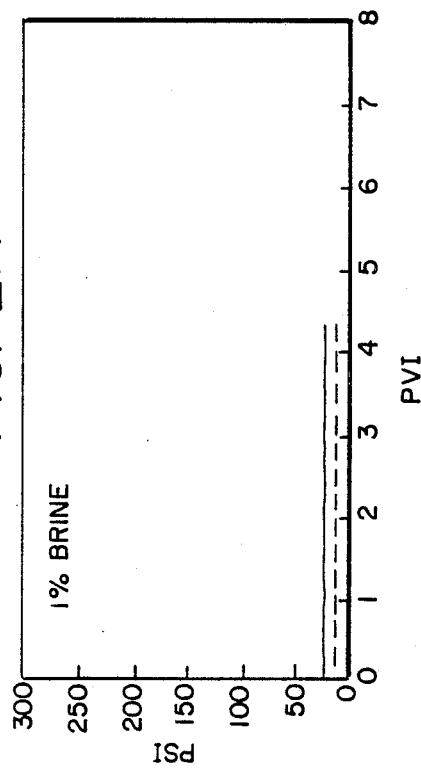
FIG. 2C
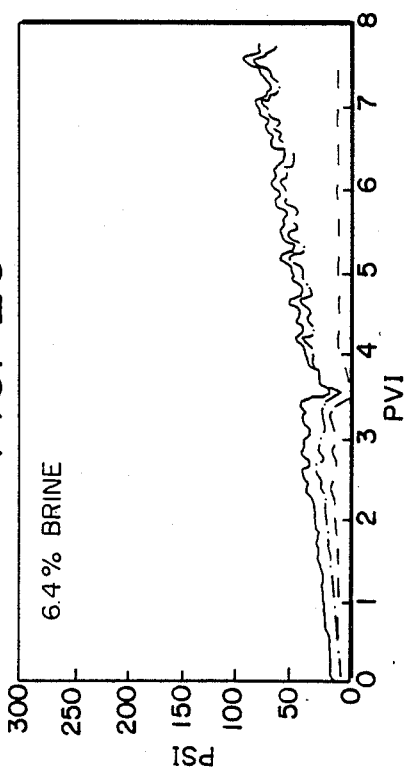
FIG. 2D
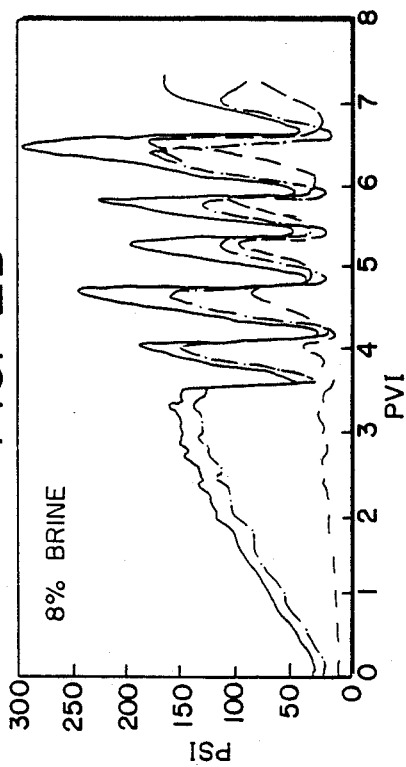

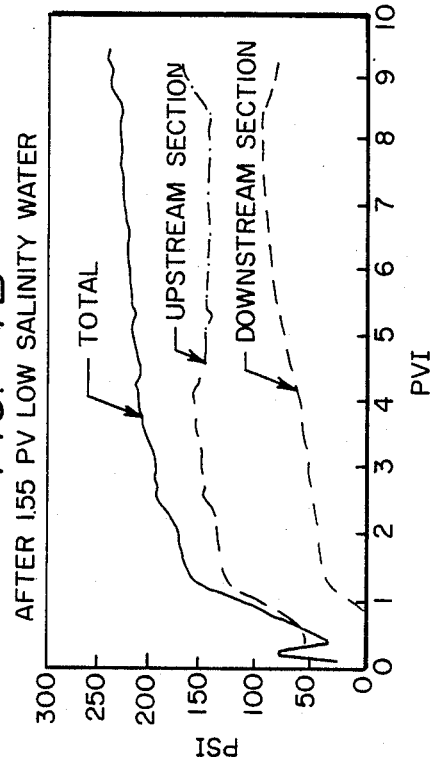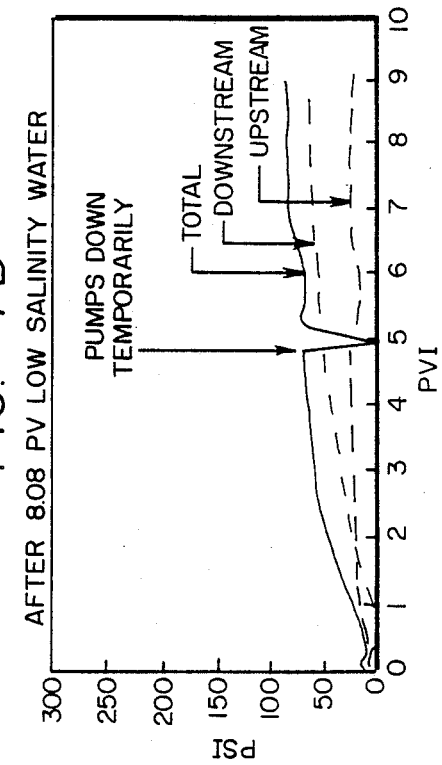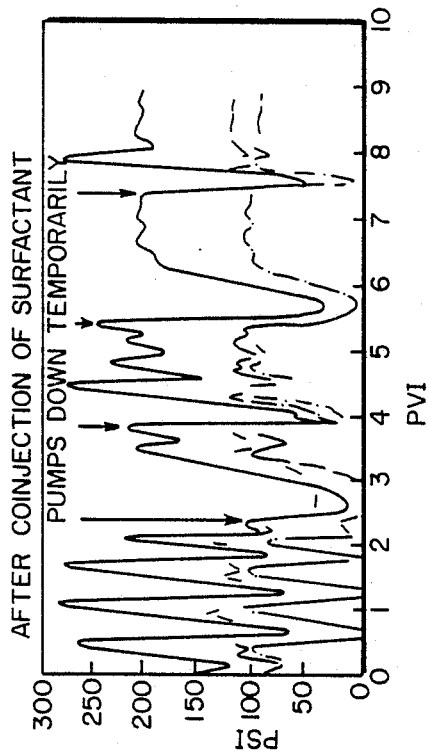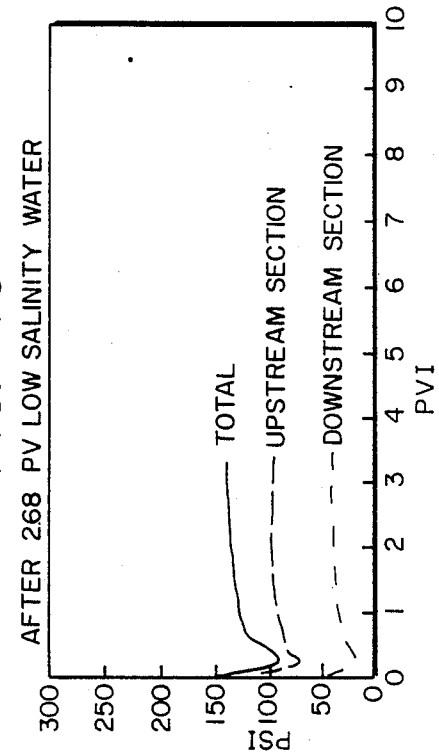

METHOD FOR IMPROVING SWEEP EFFICIENCY IN $CO_2$ OIL RECOVERY

FIELD OF INVENTION

This invention relates to a method for improving the vertical and/or horizontal volumetric sweep efficiency of a subterranean oil containing formation in a $CO_2$ flooding process by selectively plugging the relatively high permeability zones in the formation by injecting a selective surfactant or surfactant mixture into the formation which preferentially enters the relatively high permeable zones and forms a gel in-situ under the temperature, salinity, oil composition and $CO_2$ pressure conditions within the formation. Formation of the gel plugs the highly permeable zones of the formation.

BACKGROUND OF THE INVENTION

A variety of supplemental recovery techniques have been employed in order to increase the recovery of viscous oil from subterranean viscous oil containing formations. These techniques include thermal recovery methods, waterflooding and miscible flooding, particularly $CO_2$ flooding.

In heterogeneous hydrocarbon containing subterranean formations, i.e., formations having relatively high permeability zones and relatively lesser permeability zones, tertiary oil recovery processes are relatively inefficient because fluids preferentially migrate into the highly permeable zones in the subterranean formations. Migration described above is undesirable when injecting treatment fluids into oil-containing formations for the recovery of oil since the treatment fluids channel through the highly permeable zones, bypassing the less permeable zones. The result is poor conformance and flow profiles of the treatment fluid in the formation. The hydrocarbons residing in the less permeable zones are not produced and the overall yield of hydrocarbons from the formation is reduced.

To increase the efficiency of formation flooding processes, the highly permeable zones in a subterranean formations are plugged or partially plugged to prevent or reduce migration of treatment fluids into them and to divert treatment fluids into adjacent, less permeable zones. In injection profile control projects, polymeric materials have been used in liquid slurries or suspensions to effectively enter and plug or partially plug the highly permeable and/or fractured zones of the formation. Fluids injected after such a treatment therefore move into upswept areas or zones of the reservoir which results in increased oil recovery.

In my U.S. Pat. No. 4,458,760 there is disclosed a process for improving oil recovery from stratified reservoirs by (1) injecting low salinity water to reduce the salinity in high permeability zones, (2) injecting a surfactant solution into the high permeability zones, (3) injecting high salinity water into the reservoir, thereby forming a surfactant/water/oil emulsion which reduces effective brine permeability in the high permeability zones, and (4) continuing to inject high salinity water into the reservoir, whereby water is diverted to low permeability zones and oil is recovered from the low permeability zones. Low salinity water may then be injected to break-up or release the emulsion in the high permeability zones and to recover oil from the high permeability zones.

In the process of my present invention, a surfactant is injected into the formation that preferentially enters the highly permeable zones and produces a gel in-situ in the formation via interaction of the injected surfactant and subsequently injected $CO_2$ under the temperature, salinity, oil composition and $CO_2$ pressure conditions within the formation. Formation of the gel substantially plugs or partially plugs the highly porous zones to reduce channeling of injected $CO_2$ through these zones, and to divert $CO_2$ to lower permeability zones which would otherwise be by-passed by the $CO_2$ thereby resulting in more complete displacement of oil from the formation.

SUMMARY OF THE INVENTION

This invention is a method for improving the vertical and/or horizontal sweep efficiency of a subterranean oil and brine containing formation having at least one relatively high permeability zone and at least one relatively low permeability zone, the formation being penetrated by at least one injection well and a spaced apart production well in fluid communication with the formation, the method comprising: (a) determining the formation temperature and properties of the oil and brine contained within the formation; (b) injecting a predetermined amount of a surfactant solution into the formation via the injection well that perferentially enters the relatively high permeability zone or zones and forms a surfactant/brine/oil microemulsion when said surfactant mixes with the oil and brine in the formation at the temperature, pressure and salinity within the formation; (c) injecting $CO_2$ at a predetermined pressure into the formation via the injection well that preferentially enters the relatively high permeability zone or zones and upon contact with the microemulsion causes the surfactant to precipitate into a gel under the temperature, salinity, oil composition and $CO_2$ pressure conditions within the formation which substantially plugs or partially plugs the relatively high permeability zone or zones of the formation; (d) injecting a predetermined amount of $CO_2$ into the formation capable of forming a miscible bank with the oil in the relatively low permeability zones which miscible displaces $CO_2$ and oil through the relatively low permeability zone or zones of the formation and recovering oil via the production well; and (e) injecting a displacing fluid into the formation to displace $CO_2$ and oil through the relatively low permeability zones of the formation toward the production well from which oil is recovered.

The amount of $CO_2$ injected during step (d) to form a miscible bank of $CO_2$ and oil which will miscibly displace $CO_2$ and oil from the relatively low permeability zone toward the production well from which oil is recovered is within the range of 0.1 to 0.5 pore volume. Suitable displacing fluids injected during step (e) includes $CO_2$, water, a brine solution, nitrogen, flue gas, a mixture of $CO_2$ and flue gas and a mixture of $CO_2$ and recycled produced gases.

In another embodiment of the invention, the surfactant solution may be injected into the formation as a microemulsion comprising surfactant, brine and oil that preferentially enters the high permeability zones and forms a surfactant gel in-situ under the conditions of temperature, salinity, oil composition, and $CO_2$ pressure within the formation. Formation of the gel substantially plugs the high permeability zones.

In either embodiment, the surfactant gel is preferably precipitated at $CO_2$ pressures above the minimum miscibility pressure (MMP) or $CO_2$ miscible flooding, and below the prevailing reservoir pressure during the $CO_2$ flood. The surfactant may be injected prior to $CO_2$, or may be alternatively injected in WAG cycles following $CO_2$ breakthrough into the production wells.

BRIEF DESCRIPTION OF THE DRAWINGS

FIGS. 2A-2D, 3A-3C and 4A-4D provide graphs which show the effect of salinity on gel precipitation and flow resistance imparted by the precipitated gel.

DESCRIPTION OF THE PREFERRED EMBODIMENT

Figure 1A:
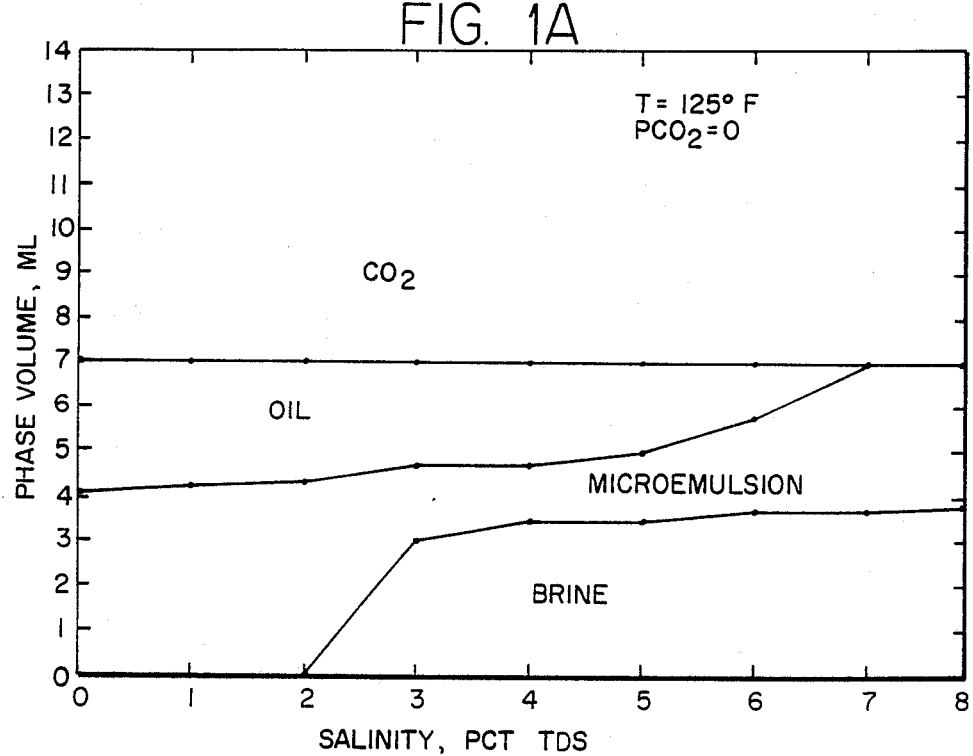
FIGS. 1A-1F provides graphs which summarize phase behavior for a particular surfactant.
Figure 1B:
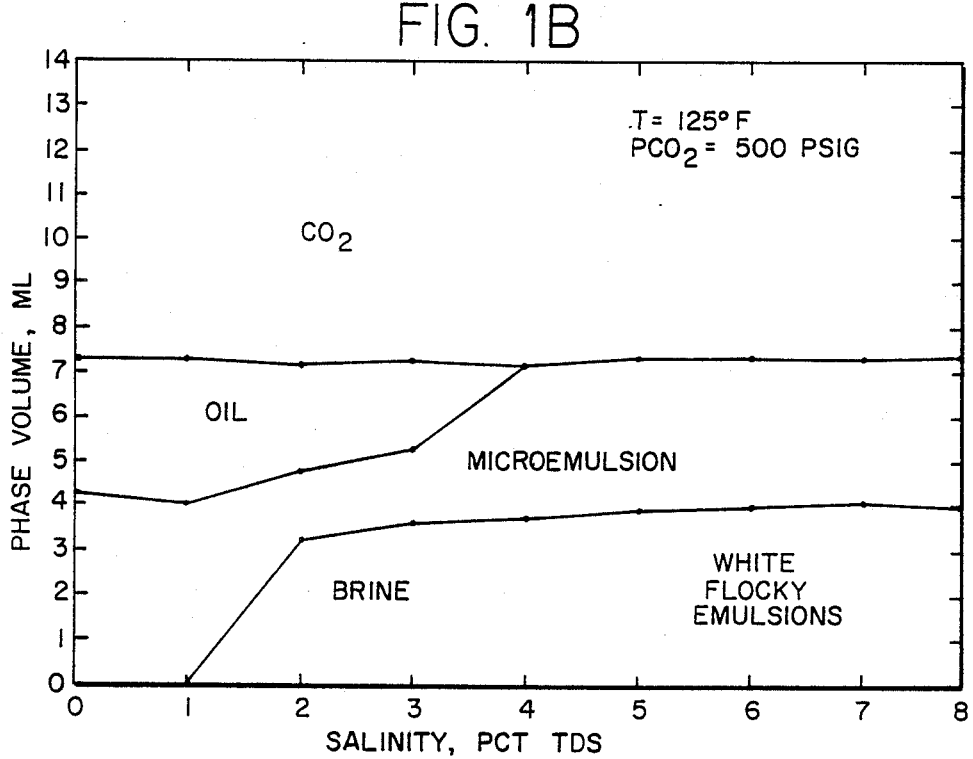
Figure 1C:
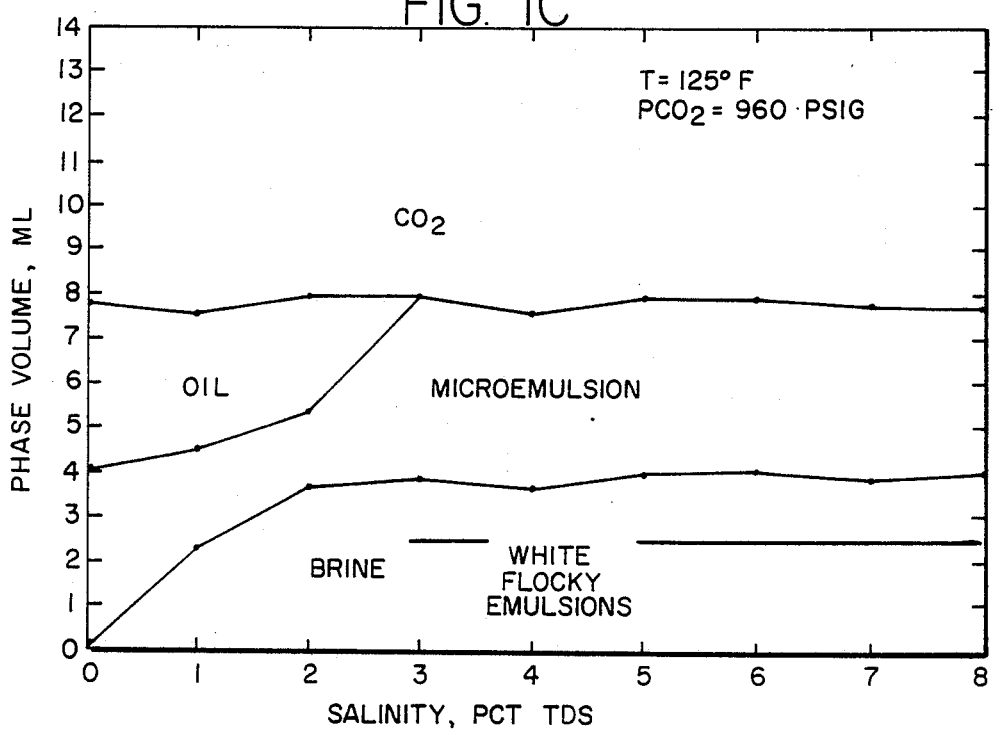
Figure 1D:
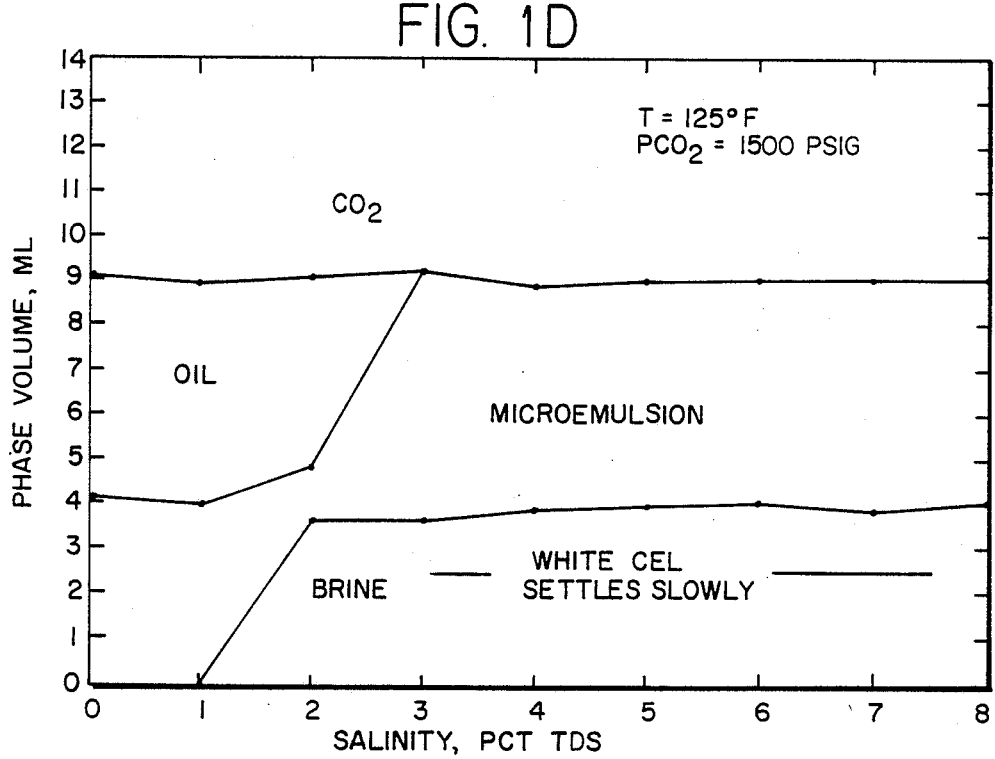

The process of my invention concerns an improvement in oil recovery by $CO_2$ flooding processes by utilizing surfactant gels to increase volumetric sweep efficiency of injected $CO_2$ that tends to channel through relatively high permeability zones in the formation. More particularly, the method is applied to a subterranean, permeable, oil and brine-containing formation penetrated by at least one injection well and at least one spaced-apart production well. The injection well and production well are perforated to establish fluid communication with a substantial portion of the formation.

While recovery of the type contemplated by the present invention may be carried out by employing only two wells, it is to be understood that the invention is not limited to any particular number of wells. The invention may be practiced using a variety of well patterns as is well known in the art of oil recovery, such as an inverted five spot pattern in which an injection well is surrounded with four production wells, or in line drive arrangement in which a series of aligned injection wells and a series of aligned production wells are utilized. Any number of wells which may be arranged according to any pattern may be applied in using the present method as illustrated in U.S. Pat. No. 3,927,716 to Burdyn et al, the disclosure of which is hereby incorporated by reference. By the term "pore volume" as used herein, is meant that pore volume of the portion of the formation underlying the well pattern employed, which is described in greater detail in the Burdyn et al patent.

The individual stratum associated with various sedimentary deposits within facies can have a wide degree of variability with respect to permeability by $CO_2$ flooding. Consequently, $CO_2$ may tend to channel through high permeability strata or stringers. When a thin section of low permeability strata is sandwiched between relatively thick sections of high permeability strata, oil may be displaced during $CO_2$ flooding from the thin section of low permeability strata by crossflow between the high permeability strata. However, such cross flow may not occur to an appreciable extent if the section of low permeability strata is sufficiently thick. Furthermore, when relatively thick sections of low permeability strata, e.g., the entire thickness of a particular facies, sandwich a central section, e.g., also corresponding to an entire facies, of high permeability strata, injected water will tend to channel through the central high permeability strata, substantially avoiding the outer low permeability strata.

Accordingly, it will be understood that the term "zone" as used herein shall refer to an individual stratum or adjacent strata composites. Thus, a zone may be as thin as an individual stratum or stringer or may be, e.g., as thick as an entire facies.

The process of the present invention utilizes surfactant solutions selected from phase behavior experiments which show surfactant gel precipitation at conditions of temperature, salinity, oil compositions and $CO_2$ pressure within the formation, to increase flow resistance in high permeability strata, thereby diverting subsequently injected $CO_2$ to low permeability zones to improve reservoir conformance or volumetric sweep efficiency.

In accordance with the invention, the formation temperature and properties of the oil and brine contained within the formation are determined. A solution containing a surfactant or surfactant mixture for injection into the formation is selected from phase behavior experiments which show gel precipitation at appropriate formation conditions of salinity, temperature, $CO_2$ pressure, and crude oil composition. Since the process of the present invention is used principally to improve oil recovery by $CO_2$ miscible flooding, the surfactant gels are preferably produced at $CO_2$ pressures between the minimum miscibility pressure (MMP) for $CO_2$ flooding and the prevailing formation pressures during the miscible flood, and a temperature, salinities, and oil composition near those existing in a particular formation being flooded with $CO_2$. Depending upon the formation temperature, there is a minimum pressure at which conditional miscibility exists between the carbon dioxide and formation oil which is known as the $CO_2$ minimum miscibility pressure (MMP). Conditional miscibility is to be distinguished from instant miscibility by the fact that miscibility in a conditional miscibility sense is achieved by a series of transition multiphase conditions wherein the carbon dioxide vaporizes intermediate components from the oil, thus creating the miscible transition zone in the formation. This minimum miscibility pressure can be determined by means of slim tube displacement tests which means conditions are established simulating those of an enriched gas drive, see paper by Yellig et al entitled, "Determination and Prediction of $CO_2$ Minimum Miscibility Pressure," J. of Pet. Tech., Jan. 1980, pp. 160-168, the disclosure of which is incorporated by reference. Briefly, $CO_2$ MMP is determined by the slim tube test wherein percent oil recovery of the in-place fluid is determined at solvent breakthrough at given pressure conditions. By varying the pressure at constant composition and temperature, a break-point is determined in a curve of percent recovery versus pressure. This break-point is indicative of the inception of conditional miscible-type behavior.

As illustrated in FIGS. 1A-1F, it has now been discovered that $CO_2$ pressure has significant effects on surfactant/brine/hydrocarbon phase behavior. The data summarized in this figure were obtained by equilibrating surfactant/brine/hydrocarbon mixtures at different $CO_2$ pressures. In these experiments, 4 ml of aqueous surfactant solutions, each 1.5 wt. percent C1720 IOS ($C_{17}$ to $C_{20}$ internal olefin sulfonate made by Shell Chemical Co., USA) plus 0.5 wt. percent Leonox K (alkylether sulfonate made by Lion Chemical Corp., Japan) plus 2.0 wt. percent isopropyl alcohol, were layered with 3 ml of a synthetic stock tank oil, a blend of pure hydrocarbons of composition shown in Table 1. The salinities of the surfactant solutions were varied from 0 to 8 wt. percent (PCT.) total dissolved solids (TDS) by appropriate dilution or concentration of the synthetic reservoir brine compositions shown in Table 2.

TABLE

SYNTHETIC CRUDE OIL COMPOSITION

| Component | Weight Percent |
| --- | --- |
| n-hexadecane | 70 |
| cyclohexane | 8 |
| decalin | 12 |
| propylbenzene | 10 |

TABLE 2

SYNTHETIC BRINE COMPOSITION

| Compound | Grams/liter |
| --- | --- |
| NaCl | 47.83 |
| $CaCl_2.1H_2O$ | 17.40 |
| $MgCl_2.6H_2O$ | 7.97 |

Following layering of surfactant brine solutions with the synthetic oil, the solutions were mixed by rocking gently under different applied pressures of $CO_2$ in a constant temperature oven. When the mixtures had solubilized as much $CO_2$ as possible during mixing, the tubular cells containing the mixture were returned to a vertical position to equilibrate under the fixed $CO_2$ pressure. The volumes of equilibrium phases formed were recorded to produce the phase maps shown in FIGS. 1A-1F.

With reference to FIGS. 1A-1F, at low $CO_2$ pressures, the surfactant/brine/hydrocarbon system exhibits a characteristic phase behavior of progressing from lower phase microemulsion (Windsor Type I) to middle phase microemulsion (Windsor Type III) to upper phase microemulsion (Windsor Type II), with increasing salinity. As $CO_2$ pressure increases, surfactant is driven progressively from lower phase microemulsion into middle and upper phase microemulsions, shifting the "optimal salinity" for surfactant flooding downward. As $CO_2$ pressure continues to increase, and as more $CO_2$ is solubilized in the oil, surfactant tends to precipitate from the upper phase microemulsions, to form first a white, flocky emulsion in the brine phase. At $CO_2$ pressures of 1500 psig in this example, the surfactant begins to precipitate from the upper oil external microemulsions and the white, flocky emulsions as a particulate gel which settles and absorbs additional water from the brine to completely fill the volume of the tubes below the microemulsion or excess oil phase. On mixing, the gel disperses but settles again as a particulate gel when the tubes are returned to a vertical position.

Figure 1E:
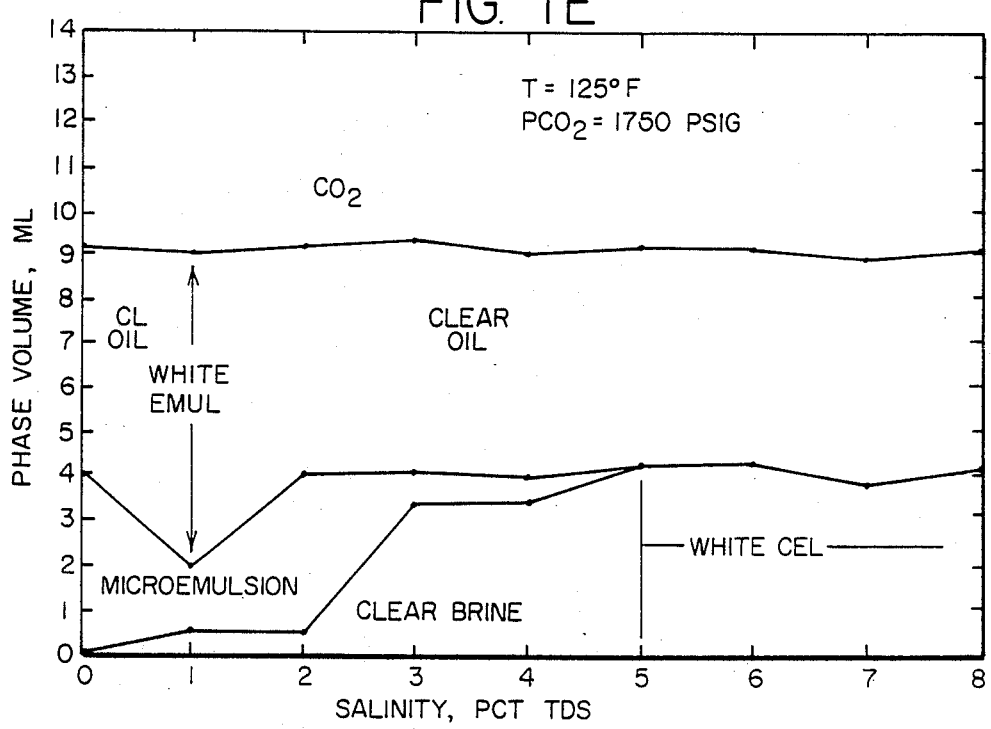
Figure 1F:
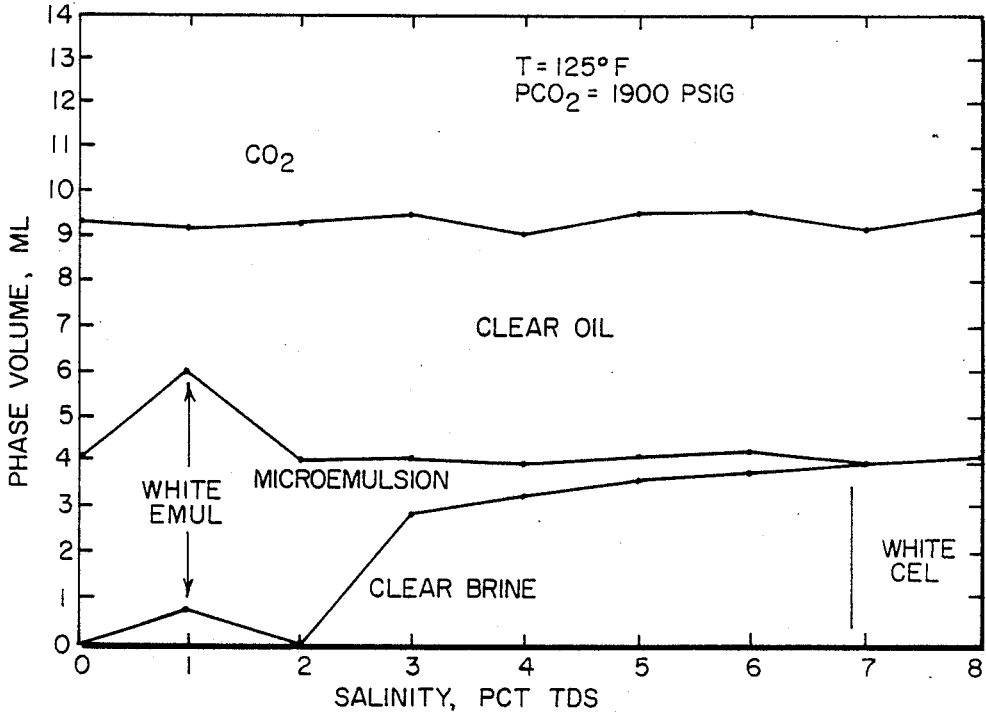

As $CO_2$ pressure continues to increase, e.g., to 1750 and 1900 psig in FIGS. 1E and 1F, the gels at lower salinities, 3 to 6 percent, tend to revert to condensed middle phase microemulsions, whereas the gels at higher salinities, 7 and 8 percent in this example, become more rigid and tend to adhere to the sapphire walls of the phase behavior cells.

These types of gels may be produced in-situ in $CO_2$ flooding processes to improve sweep efficiency of $CO_2$. In the first step of the invention a predetermined amount of an aqueous surfactant solution is injected into the formation via the injection well. The injected aqueous surfactant will flow preferentially into the high permeability zones and fractures and form microemulsion phases on mixing with the formation crude oil and brine. The quantity of aqueous surfactant injected into the formation is within the range of 0.1 to 1.0 pore volumes, based upon the pore volume of the relatively high permeability zone or zones between the injection well and the production wells. This amount will vary depending upon the porosity, thickness and oil and water saturation of the formation treated. The preferred volume of the aqueous surfactant injected into the formation will depend upon formation characteristics and the degree of plugging desired.

Suitable surfactants may be selected from the group consisting of alkylsulfonates, alkylarylsulfonates, alpha olefin sulfonates, internal olefin sulfonates, petroleum sulfonates, ethoxylated alcohols, ethoxylated alkylphenols, ethoxylated alkylsulfonates, and ethoxylated alkyarylsulfonates. A preferred surfactant is a $C_{17}$ to $C_{20}$ internal olefin sulfonate sold under the tradename "C1720 IOS" by Shell Chemical Company. The preferred surfactant solution may also contain an oxyalkylated sulfonate cosurfactant, such as that sold under the tradename "Leonox K" by Lion Chemical Corp., Japan, to increase the solubility of the surfactant in the preferred injection brine. The total surfactant concentration may vary from 0.05 to 5 wt. percent, preferably from 0.1 to 0.5%. The salinities of aqueous surfactant solutions will vary from 0 to 20 wt. percent depending upon the salinity of the formation in the high permeability zones.

The aqueous surfactant solution injected into the formation preferentially enters the high permeability zones and upon mixing with the brine and oil contained in these zones forms a surfactant/brine/oil microemulsion at the temperature, pressure and salinity within the formation. The surfactant or surfactant mixture is selected such that the microemulsion formed at formation temperature, pressure, and salinity will subsequently precipitate as a gel when contacted and pressurized with $CO_2$.

After the desired amount of aqueous surfactant has been injected into the formation, carbon dioxide is injected into the formation via the injection well that preferentially enters the higher permeability zones and fingers through the more viscous surfactant/brine/oil microemulsion and, as $CO_2$ pressure in the formation is increased, a gel will precipitate which substantially plugs or partially plugs the high permeability zones. Gelation preferably occurs at the formation temperature and salinity and at $CO_2$ pressure greater than the $CO_2$ MMP for the reservoir crude oil. Thereafter, a predetermined amount of $CO_2$ is injected into the formation capable of forming a miscible bank with the oil in the relatively low permeability zones which miscibly displaces $CO_2$ and oil through the relatively low permeability zones of the formation toward the production well from which oil is produced. The amount of $CO_2$ injected to form a miscible bank with the oil in the relatively low permeability zones is within the range of 0.1 to 0.5 pore volume depending upon the formation characteristics. Once the amount of $CO_2$ has been injected, a displacing fluid is injected into the formation to displace $CO_2$ and oil through the relatively low permeability zones of the formation toward the production well from which oil is recovered. The displacing fluid may be $CO_2$, water, a brine solution, nitrogen, flue gas, a mixture of $CO_2$ and flue gas, or a mixture of $CO_2$ and recycled produced gases. The preferred displacing fluid is a brine solution.

The carbon dioxide preferably is introduced into the injection well in the liquified state because less energy is required than pumping it in the gaseous state. As the liquid carbon dioxide descends in the wellbore, it is heated by a naturally increasing temperature, causing it to become gaseous within the wellbore or in the formation in the immediate vicinity of the wellbore. The injected carbon dioxide will preferentially enter the higher permeability zones and finger through the more viscous surfactant/brine/oil microemulsion and, as $CO_2$ pressure in the formation is increased, a gel will precipitate which substantially plugs or partially plugs the high permeability zones. Gelation preferably occurs at the formation temperature and salinity and at $CO_2$ pressure greater than the MMP for the reservoir crude oil.

In another embodiment, surfactant injection is deferred until $CO_2$ channeling problems become obvious by appearance of high $CO_2$ cuts in the production well, in which case only those areas of the field where $CO_2$ channeling is a severe problem may be treated. Therefore, in this embodiment, $CO_2$ is injected into the formation prior to injection of the surfactant and oil is recovered from the formation via the production well until $CO_2$ breakthrough occurs at the production well. In this embodiment, depending upon the amount of residual oil remaining in the high permeability $CO_2$ swept zones, it may be desirable to coinject a selected hydrocarbon with the aqueous surfactant to form the microemulsion phase from which the gel is precipitated in-situ by subsequent injection of $CO_2$. Suitable hydrocarbons may be selected from the group consisting of refined hydrocarbons, kerosine, diesel fuel, gas oil, and stock tank crude oil.

In still another embodiment, it may be desirable to inject surfactant in the form of a microemulsion prepared in surface facilities from surfactant, brine, and a selected hydrocarbon as discussed above. Surfactant concentration in the microemulsion may range from 1 to 20 wt. %, preferably 2 to 5 %. The injected microemulsion may be either a water-external or oil-external microemulsion formed from mixing aqueous surfactant, brine and a selected hydrocarbon as described above. Thereafter, $CO_2$ is injected into the formation to produce the gel in-situ by the same fingering mechanism as previously described.

In still another embodiment, it may be desirable to inject alternate slugs of surfactant and $CO_2$ in WAG cycles or alternate slugs of surfactant, water and $CO_2$ to reduce channeling of $CO_2$ in the formation. The salinity of the slug of water is less than that required to precipitate a gel from the surfactant being injected into the formation. Again, depending upon residual oil saturations expected in the high permeability zones with each successive WAG cycle, it may be desirable to coinject oil or a selected hydrocarbon with the surfactant or inject the surfactant in the form of a surface prepared microemulsion to assure presence of enough oil to form the surfactant gel.

Regardless of the timing or form of surfactant injection, precautions must be taken to prevent precipitation of the surfactant gel in the immediate vicinity (10 to 15 ft. radius) of the injection wells, and thus avoid serious reduction of well injectivities. To prevent precipitation of gel in the immediate vicinity of injection wells, the surfactant may be injected at a salinity below which upper phase microemulsion phases are produced and gels are precipitated (below about 2 wt. percent brine in this example). The upper phase microemulsion and gel phases are produced as the injected low salinity surfactant mixes with higher salinity formation brine and crude oil farther out in the formation.

Another means of preventing gel precipitation within immediate vicinities of injection wells is to use brine spacers between injected surfactant (or surfacant microemulsion) and $CO_2$ slugs. Thus, as in a WAG cycle, $CO_2$ should be displaced from the vicinity of the injection well by brine before injecting surfactant, and the surfactant should in turn be displaced by a small amount of brine before resumption of $CO_2$ injection.

The effect of salinity on gel precipitation and flow resistance imparted by precipitated gel is illustrated in FIGS. 2A-2D. Those figures show pressure drops (PSI) across a 158 md porcelain core during three-phase flow experiments. In these experiments, $CO_2$, aqueous surfactant, and the synthetic oil of Table 1 were coinjected at fixed proportions of 73.9%, 13.0%, and 13.1%, respectively, at a total flow rate of 29.8 cc/hr. (11.03 ft./day), against a back pressure of 1900 psig. At 1% salinity, where the upper phase microemulsion and gel phases do not form, pressure drops across the core were very low, not significantly different from reference three-phase flow pressure drops obtained with $CO_2$, oil and surfactant-free brine coinjected at the same rates. Pressure gradients at fixed flow rates increase progressively at 4%, 6.74%, and 8% aqueous surfactant salinities, as the resultant gel phases become more copious and rigid. According to the 1900 psi phase diagram of FIG. 1F, the gel is expected to precipitate t 6.74% and 8% salinities, but not at 1% or 4%. The experiments of FIGS. 2A-2D were performed using the same core in the sequence of aqueous surfactant salinites of 6.74%, 1%, 4%, and 8% successively. The high pressure drops built by 6.74% surfactant coinjection were dissipated by 1% aqueous surfactant coinjection, and increased as salinity of the coinjected surfactant solution increased. The gels formed by three-phase coinjection were apparently formed mostly in the upstream section of the core, showing the need for avoiding direct mixing of oil, aqueous surfactant, and $CO_2$ components in the vicinity of injection wells under conditions of salinity, temperature, and $CO_2$ pressure where the gel is precipitated.

The cyclical character of the pressure drops at 8% salinity, observed to a lesser extent at 6.74% salinity, suggests the gel may have thixotropic properties. The cyclical response was obtained on resumption of three-phase flow following an overnight shut-down of the injection pumps, which may have allowed the precipitated gel to set-up in the core. Thereafter, the gel appeared to exhibit a yield stress which allowed intemittent flow and pressure dissipation, followed by resetting of the gel to obstruct flow until the yield stess again was exceeded.

Figure 3A:
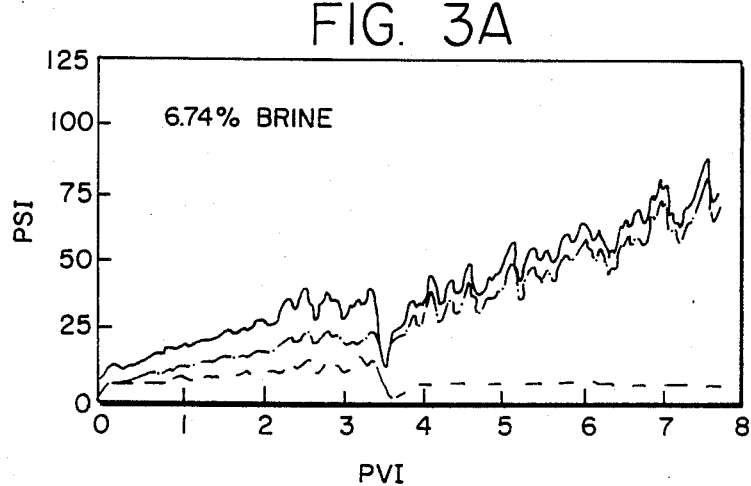
Figure 3B:
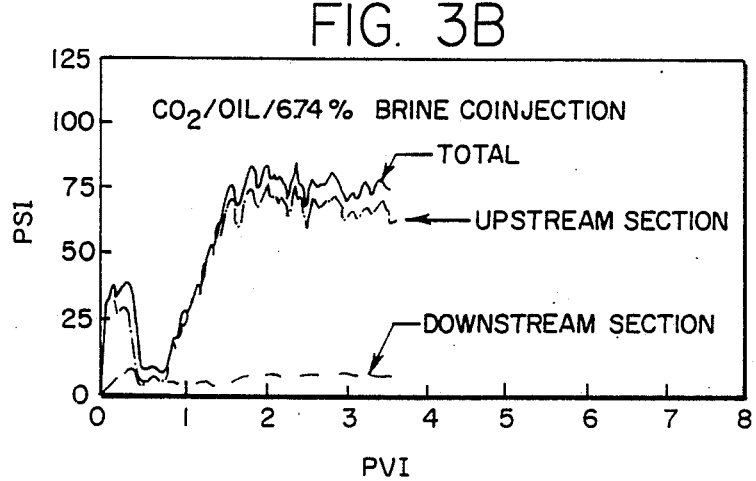
Figure 3C:
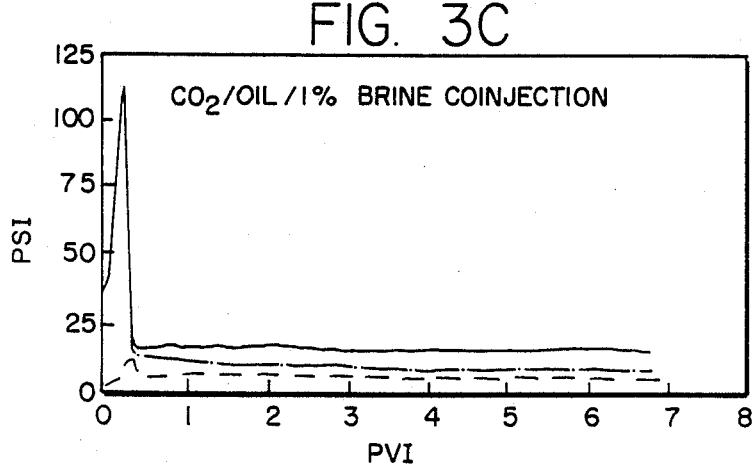

FIGS. 3A-3C shows that the high flow resistances imparted by the gel are retained during subsequent flow of $CO_2$, oil, and high salinity brine. However, high flow resistance is not maintained for injection or coinjection of a brine of lower salinity than that required for the gel to precipitate, as seen in the case of 1% brine coinjection. This sensitivity of flow resistance to brine salinity may make the surfactant gel superior in one respect to surfactant foams or polymer gels for mobility control and profile modification in $CO_2$ miscible processes. Both of the latter agents may impart more permanent losses of fluid injectivities in injection wells.

The sensitivity of surfactant gel precipitation to salinity and $CO_2$ pressure also provides a mechanism by which a surfactant gel may be propagated in the reservoir. Once a surfactant gel has been precipitated in the reservoir by one of the procedures described earlier, injection of low salinity water and/or reduction of $CO_2$ pressure below conditions for which the gel forms should result in reversion of the surfactant gel to a microemulsion. Continued fluid injection will move the microemulsion farther out into the reservoir where mixing of the microemulsion with higher salinity brine and/or reestablishing higher $CO_2$ pressure will precipitate the gel.

The potential for propagating the gel by this mechanism is illustrated in FIGS. 4A-4D which show the pressure drops in three-phase flow experiments similar to the one described earlier (same core, same three-phase fluid injection rates). FIG. 4A shows a cyclical character similar to that exhibited by three-phase coinjection of $CO_2$, oil, and surfactant at 8% salinity, described previously. Successively larger increments of low salinity water (1% NaCl and distilled water) were injected intermittently during this three-phase flow experiment to move the gel from the upstream section of the core to the downstream section. During each cycle of low salinity water injection, pressure drops across the core decreased markedly, but were re-established by resumption of three-phase flow with 8% brine. By the time 1.55 pore volume of low salinity water had thus been injected, the cyclical character of flow had been supplanted by near steady-state flow, and flow resistance was still higher in the upstream section of the core (FIG. 4B). Following further increments of low salinity water injection, accompanied by production of surfactant microemulsion from the core, three-phase flow continued to be steady-state, pressure drops declined and flow resistance continued to be greater in the upstream section (FIG. 4C). Following 8.08 pore volumes of intermittent low salinity water injection (PVI), steady-state pressure drops had declined substantially, and most of the residual flow resistance had been moved to the downstream section of the core (FIG. 4D).

These data illustrate how a surfactant gel can be precipitated in high permeability zones within an oil reservoir to markedly increase flow resistance, and thus divert subsequently injected $CO_2$ to other zones within the reservoir. Although the data are representative of one surfactant/brine/hydrocarbon/$CO_2$ system, the behavior is believed to be general for these types of systems. Surfactant and surfactant mixtures different from the example system described here are expected to be useful for different oil reservoirs, and surfactants and surfactant mixtures appropriate for each reservoir application may be selected from phase behavior and flow experiments similar to those described, using fluid samples, temperature, and pressures appropriate for the target reservoir.

In general, surfactants useful in surfactant flooding processes, i.e., those which produce the characteristic transition from lower phase to middle phase to upper phase microemulsion systems with increasing salinity, are expected to be useful for precipitating surfactant gels when pressurized with $CO_2$. Thus, a useful screening procedure for selecting a surfactant to produce a surfactant gel for $CO_2$ diversion is to screen surfactants or surfactant mixtures expected to have an optimal salinity for surfactant flooding near the salinity of the target $CO_2$ flood reservoir.

The invention as described herein is capable of a variety of modifications and variations which will be apparent to a person skilled in the art and which are included in the spirit of the claims appended hereto.

What is claimed is:

1. A method for improving the vertical and/or horizontal sweep efficiency of a subterranean oil and brine containing formation having at least one relatively high permeability zone and at least one relatively low permeability zone, the formation being penetrated by at least one injection well and a spaced apart production well in fluid communication with the formation, the method comprising:
   (a) determining the formation temperature and properties of the oil and brine contained within the formation;
   (b) injecting a predetermined amount of a surfactant solution into the formation via the injection well that perferentially enters the relatively high permeability zone or zones and forms a surfactant/brine/oil microemulsion when said surfactant mixes with the oil and brine in the formation at the temperature, pressure and salinity within the formation;
   (c) injecting $CO_2$ at a predetermined pressure into the formation via the injection well that preferentially enters the relatively high permeability zone or zones and upon contact with the microemulsion causes the surfactant to precipitate into a gel under the temperature, salinity, oil composition and $CO_2$ pressure conditions within the formation, which substantially plugs the relatively high permeability zone or zones of the formation; and
   (d) injecting a predetermined amount of $CO_2$ into the formation capable of forming a miscible bank with the oil in the relatively low permeability zones which miscibly displaces $CO_2$ and oil through the relatively low permeability zones of the formation toward the production well and recovering oil via the production well; and
   (e) injecting a displacing fluid into the formation to displace $CO_2$ and oil through the relatively low permeability zones of the formation toward the production well from which oil is recovered.

2. A method according to claim 1 wherein the $CO_2$ is injected at a pressure above the minimum miscibility pressure for $CO_2$ miscible flooding and below the prevailing formation pressure.

3. A method according to claim 1 wherein the surfactant is selected from the group consisting of alkyl sulfonates, alkylaryl sulfonates, internal olefin sulfonates, alpha olefin sulfonates, petroleum sulfonates, ethoxylated alcohols, ethoxylated alkylphenols, ethoxylated alkyl sulfonates, and ethoxylated alkylarylsulfonates.

4. A method according to claim 1 wherein the salinity of the surfactant solution is below about 2 wt. percent.

5. A method according to claim 1 wherein from 0.1 to 1.0 pore volumes, with respect to the pore volume of the relatively high permeability zone or zones between the injection well and production wells, of the surfactant are injected into the formation according to step (b).

6. A method according to claim 1 wherein the surfactant solution precipitates a gel at the reservoir temperature, salinity and $CO_2$ pressure equal to or greater than the minimuim miscibility pressure for the reservoir oil.

7. A method according to claim 6 wherein the $CO_2$ pressure is greater than 1000 psi.

8. A method according to claim 1 wherein the displacing fluid is selected from the group consisting of $CO_2$, water, a brine solution, nitrogen, flue gas, a mixture of $CO_2$ and flue gas and a mixture of $CO_2$ and recycled produced gases.

9. A method according to claim 1 wherein the amount of $CO_2$ injected during step (d) to form a miscible bank of $CO_2$ and oil is 0.1 to 0.5 pore volume.

10. A method according to claim 1 wherein the surfactant is a $C_{17}$ to $C_{20}$ internal olefin sulfonate and the surfactant solution has a salinity equal to or less than the salinity of the formation brine.

11. A method for improving the vertical and/or horizontal sweep efficiency of a subterranean oil and brine containing formation having at least one relatively high permeability zone and at least one relatively low permeability zone, the formation being penetrated by at least one injection well and a spaced apart production well in fluid communication with the formation, the method comprising:
(a) determining the formation temperature and properties of the oil and brine contained within the formation;
(b) injecting $CO_2$ into the formation and recovering oil from the formation via the production well until $CO_2$ breakthrough occurs at the production well;
(c) injecting a predetermined amount of a surfactant solution into the formation via the injection well that preferentially enters the relatively high permeability zone or zones and forms a surfactant/brine/oil microemulsion when said surfactant mixes with the oil and brine in the formation at the temperature, pressure and salinity within the formation;
(d) injecting $CO_2$ at a predetermined pressure into the formation via the injection well that preferentially enters the relatively high permeability zone or zones and upon contact with the microemulsion causes the surfactant to precipitate into a gel under the temperature, salinity, oil composition and $CO_2$ pressure conditions within the formation which substantially plugs the relatively high permeability zone or zones of the formation;
(e) injecting a predetermined amount of $CO_2$ into the formation capable of forming a miscible bank with the oil in the relatively low permeability zones which miscibly displaces $CO_2$ and oil through the relatively low permeability zones of the formation toward the production well and recovering oil via the production well; and
(f) injecting a displacing fluid into the formation to displace $CO_2$ and oil through the relatively low permeability zones of the formation toward the production well from which oil is recovered.

12. A method according to claim 11 wherein the $CO_2$ is injected at a pressure above the minimum miscibility pressure for $CO_2$ miscible flooding and below the prevailing formation pressure.

13. A method according to claim 11 wherein the surfactant is selected from the group consisting of alkyl sulfonates, alkylaryl sulfonates, internal olefin sulfonates, alpha olefin sulfonates, petroleum sulfonates, ethoxylated alcohols, ethoxylated alkylphenols, ethoxylated alkyl sulfonates, and ethoxylated alkylarylsulfonates.

14. A method according to claim 11 wherein the salinity of the surfactant solution is below about 2 wt. percent.

15. A method according to claim 11 wherein from 0.1 to 1.0 pore volumes, with respect to the pore volume of the relatively high permeability zone or zones between the injection well and production well, of the surfactant are injected into the formation according to step (c).

16. A method according to claim 11 wherein the surfactant solution precipitates a gel at the reservoir temperature, salinity and $CO_2$ pressure equal to or greater than the $CO_2$ minimin miscibility pressure for the reservoir oil.

17. A method according to claim 16 wherein the $CO_2$ pressure is greater than 1000 psi.

18. A method according to claim 11 wherein the displacing fluid is selected from the group consisting of $CO_2$, water, a brine solution, nitrogen, flue gas, a mixture of $CO_2$ and flue gas and a mixture of $CO_2$ and recycled produced gases.

19. A method according to claim 11 wherein the amount of $CO_2$ injected during step (e) to form a miscible bank of $CO_2$ and oil is 0.1 to 0.5 pore volume.

20. A method according to claim 12 wherein the surfactant injected into the formation during step (c) is mixed with a selected hydrocarbon when the residual oil saturation in the high permeability zone after $CO_2$ flooding in less than about 5% pore volume.

21. A method according to claim 13 wherein the surfactant is a $C_{17}$ to $C_{20}$ internal olefin sulfonate and the surfactant solution has a salinity equal to or less than the salinity of the formation.

22. A method for improving the vertical and/or horizontal sweep efficiency of a subterranean oil containing formation having at least one relatively high permeability zone and at least one relatively low permeability zone, the formation being penetrated by at least one injection well and a spaced apart production well in fluid communication with the formation, the method comprising
(a) determining the formation temperature and properties of the oil and brine contained within the formation,
(b) injecting a predetermined amount of a microemulsion solution comprising a surfactant, brine and a selected hydrocarbon into the formation via the injection well that preferentially enters the relatively high permeability zone or zones,
(c) injecting $CO_2$ at a predetermined pressure into the formation via the injection well that preferentially enters the relatively high permeability zone or zones and upon contact with the microemulsion causes the surfactant to precipitate into a gel under the temperature, salinity, oil composition and $CO_2$ pressure conditions within the formation, said gel plugging the relatively high permeability zone or zones of the formation;
(d) injecting a predetermined amount of $CO_2$ into the formation capable of forming a miscible bank with the oil in the relatively low permeability zones which miscibly displaces $CO_2$ and oil through the relatively low permeability zones of the formation toward the production well and recovering oil via the production well; and
(e) injecting a displacing fluid into the formation to displace $CO_2$ and oil through the relatively low permeability zones of the formation toward the production well from which oil is recovered.

23. A method according to claim 22 wherein the $CO_2$ is injected at a pressure above the minimum miscibility pressure for $CO_2$ miscible flooding and below the prevailing formation pressure.

24. A method according to claim 22 wherein the surfactant is selected from the group consisting of alkyl sulfonates, alkylaryl sulfonates, internal olefin sulfonates, alpha olefin sulfonates, petroleum sulfonates, ethoxylated alcohols, ethoxylated alkylphenols, ethoxylated alkyl sulfonates, and ethoxylated alkylarylsulfonates.

25. A method according to claim 22 wherein the salinity of the microemulsion is below about 2 wt. percent.

26. A method according to claim 22 wherein from 0.1 to 1.0 pore volumes, with respect to the pore volume of the relatively high permeability zone or zones between the injecting well and production well, of the microemulsion solution are injected into the formation according to step (b).

27. A method according to claim 22 wherein the microemulsion solution precipitates a gel at reservoir temperature, salinity and $CO_2$ pressure equal to or greater than the $CO_2$ minimum miscibility pressure for the reservoir oil.

28. A method according to claim 27 wherein the $CO_2$ pressure is greater than 1000 psi.

29. A method according to claim 22 wherein the displacing fluid is selected from the group consisting of $CO_2$, water, a brine solution, nitrogen, flue gas, a mixture of $CO_2$ and flue gas and a mixture of $CO_2$ and recycled produced gases.

30. A method according to claim 22 wherein the amount of $CO_2$ injected during step (d) to form a miscible bank of $CO_2$ and oil is 0.1 to 0.5 pore volume.

31. A method according to claim 22 wherein $CO_2$ is injected into the formation prior to step (b) and recovering oil from the formation via the production well until $CO_2$ breakthrough occurs at the production well.

32. A method according to claim 22 wherein the microemulsion is prepared from a $C_{17}$ to $C_{20}$ internal olefin sulfonate, a brine having a salinity about equal to the salinity of the formation, and hydrocarbon selected from the group consisting of refined hydrocarbons, kerosine, diesel fuel, gas oil and stock tank crude.

33. A method according to claim 22 wherein the surfactant concentration in the microemulsion solution is in the range of 1 to 20 wt. %.

34. A method according to claim 22 wherein the surfactant concentration in the microemulsion solution is in the range of 2 to 5 wt. %.

35. A method according to claim 22 wherein the microemulsion solution comprises a water-external microemulsion formed from mixing aqueous surfactant, brine and a selected hydrocarbon.

36. A method according to claim 22 wherein the microemulsion solution comprises an oil-external microemulsion formed from mixing aqueous surfactant, brine and a selected hydrocarbon.

37. A method according to claim 22 wherein the selected hydrocarbon in step (b) is selected from the group consisting of refined hydrocarbons, kerosine, diesel fuel, gas oil and stock tank crude oil.

38. A method for improving the vertical and/or horizontal sweep efficiency of a subterranean oil and brine containing formation having at least one relatively high permeability zone and at least one relatively low permeability zone, the formation being penetrated by at least one injection well and a spaced apart production well in fluid communication with the formation, the method comprising:

(a) determining the formation temperature and properties of the oil and brine contained within the formation;

(b) injecting a slug of surfactant solution into the formation via the injection well that preferentially enters the relatively high permeability zone or zones and forms a surfactant/brine/oil microemulsion when said surfactant mixes with the oil and brine in the formation at the temperature, pressure and salinity within the formation;

(c) injecting a slug of $CO_2$ at a predetermined pressure into the formation via the injection well that preferentially enters the relatively high permeability zone or zones and upon contact with the microemulsion causes the surfactant to precipitate a gel under the temperature, salinity, oil composition and $CO_2$ pressure conditions within the formation which substantially plugs a portion of the relatively high permeability zone or zones; and (d) injecting a predetermined amount of $CO_2$ into the formation capable of forming a miscible bank with the oil in the relatively low permeability zone which miscibly displaces $CO_2$ and oil through the relatively low permeability zones of the formation toward the production well and recovering oil via the production well;

(e) injecting a displacing fluid into the formation to displace $CO_2$ and oil through the relatively low permeability zones of the formation toward production well from which oil is recovered; and (f) repeating steps (b), (c), (d) and (e) for a plurality of cycles.

39. A method according to claim 38 wherein a slug of water is injected prior to injection of the slug of $CO_2$.

40. A method according to claim 39 wherein the slug of water has a salinity less than required to precipitate a gel from the surfactant solution being injected in the reservoir.

41. A method according to claim 38 wherein the slug of surfactant solution has a salinity of 0 to 2 wt. percent.

42. A method according to claim 38 wherein the $CO_2$ is injected at a pressure above the minimum miscibiity pressure for $CO_2$ miscible flooding and below the prevailing formation pressure.

43. A method according to claim 38 wherein the surfactant is a $C_{17}$ to $C_{20}$ internal olefin sulfonate and the slug of surfactant solution has a salinity equal to or lower than the salinity of the formation.

44. A method according to claim 38 wherein the slug of surfactant solution precipitates a gel at reservoir temperature, salinity and $CO_2$ pressure equal to or greater than the $CO_2$ minimum miscibility pressure for the reservoir oil.

45. A method according to claim 44 wherein the $CO_2$ pressure is greater than 1000 psi.

46. A method according to claim 38 wherein from 0.1 to 1.0 pore volume, with respect to the pore volume of the relatively high permeability zone or zones, of slugs of surfactant and $CO_2$ are injected into the formation according to steps (b) and (c).

* * * * *